United States Patent [19]

Kao

[11] 4,245,211
[45] Jan. 13, 1981

[54] MICR WAVEFORM ANALYZER
[75] Inventor: Charles T. Kao, Richardson, Tex.
[73] Assignee: Recognition Equipment Incorporated, Irving, Tex.
[21] Appl. No.: 959,970
[22] Filed: Nov. 13, 1978
[51] Int. Cl.[3] ............................................. G06K 9/62
[52] U.S. Cl. ............................................. 340/146.3 C
[58] Field of Search ............. 340/146.3 C, 146.3 AC, 340/146.3 Z; 235/449

[56] References Cited

U.S. PATENT DOCUMENTS

| | | | |
|---|---|---|---|
| 3,089,123 | 5/1963 | Hennis et al. | 340/146.3 C |
| 3,302,174 | 1/1967 | Djinis et al. | 340/146.3 C |
| 3,316,536 | 4/1967 | Andrews et al. | 340/146.3 C |
| 3,528,058 | 9/1970 | Bond | 340/146.3 C |
| 3,535,682 | 10/1970 | Dykaar et al. | 340/146.3 C |
| 3,629,829 | 12/1971 | Ordower | 340/146.3 C |
| 3,851,309 | 11/1974 | Kenney et al. | 340/146.3 C |
| 3,930,231 | 12/1975 | Henrichon, Jr. et al. | 340/146.3 AC |
| 4,080,528 | 3/1978 | Kao et al. | 340/146.3 C |
| 4,143,355 | 3/1979 | MacIntyre | 340/146.3 C |
| 4,143,356 | 3/1979 | Nally | 340/146.3 C |
| 4,148,010 | 4/1979 | Shiau | 340/146.3 C |

OTHER PUBLICATIONS

Ordower et al., "Char. Rec. by Continuous Time Domain Comparison," *IBM Tech. Disclosure Bulletin*, vol. 10, No. 4, Sep. 1967, pp. 380–381.

*Primary Examiner*—Leo H. Boudreau
*Attorney, Agent, or Firm*—John E. Vandigriff

[57] ABSTRACT

A MICR waveform analyzer for reading E-13B magnetic ink characters including a digital phase lock loop to locate the character, a Normalizer to compress data and equalize ink strength dynamic range, and a waveform amplitude analyzer to identify the magnetically read character is described.

6 Claims, 6 Drawing Figures

MICR WAVEFORM ANALYZER

FIELD OF THE INVENTION

This invention relates to automated Magnetic Ink Character Recognition (MICR) for E-13B font printed to the specification of the American Bankers Association, and more particularly to a low cost magnetic ink character recognition (MICR) system employing a phase lock loop to locate the character horizontal location and to analyze the waveform from a single channel, single gap read head.

DESCRIPTION OF THE PRIOR ART

High speed MICR readers are well known and have been manufactured by several companies to process checks. Once such system is manufactured by Recognition Equipment Incorporated and uses an AC modulated write signal and a multi-element read head. Such a system is too expensive for low speed, low volume applications.

SUMMARY OF THE INVENTION

The present invention was developed for a low speed compact document transport. A single write head magnetizes the ferrous material in the printed characters and a read head adjacent the write head senses the magnetic field of the magnetized characters. The system includes both a digital phase lock loop and an amplitude analyzer for producing signals from which a character decision is made.

Both horizontal and vertical data compression techniques are applied to reduce the time and hardware requirements for waveform analyzing logic. A multi-weighted character waveform ROM is then used for final analyzing the compressed waveform for character recognition.

The foregoing and other features and technical advances of the invention will become apparent from the following and more detailed description of a preferred embodiment of the invention as illustrated in the accompanying drawings.

BRIEF DESCRIPTION OF THE DRAWINGS

FIG. 1 is a representation of the functional portion of a transport in which the magnetic sensing head is installed.

As a document is dropped into the feeder, it is sensed by an item presence detector (IPD-A) at the bottom of the feeder throat. The document is deskewed and advanced forward to the transport belts.

Acting on a timed signal from the feeder IPD, the transport drive motor is initiated and the belts move in a clockwise or left to right mode. The document is pinched between the jam release belt and the pinch roller as the belts accelerate up to a constant speed of 25 inches per second (IPS).

Just prior to the read station, the jam release belt engages the drive belt and the leading edge of the document is sensed by a second IPD (IPD-B). This IPD starts a timing clock which tells the down range IPD (IPD-C) when to expect the document.

E-13B coded documents are read at the MICR station situated just below the R/V optical housing. The head assembly consists of two separate heads attached to each other. The write head has a single 0.005" gap, 0.6" in height. Its internal DC resistance may be for example, approximately 110 ohm and energized with a current of 45 ma when connected to the +5v supply.

The read head has a single 0.003" gap, 0.6" in height. The head assembly is mounted in the transport so that the lower end of the gap aligns with the bottom of the paper path.

As the document enters the MICR station, the write head magnetizes the ferrous material in the printed characters. The adjacent read head then senses or reads this magnetic field and sends the characteristics signal to the MICR logic board. Since the strength of the magnetic field drops off significantly with distance between the character and the read head, it is imperative to maintain proper document positioning. To maintain this positioning there are two spring loaded plastic platens built into the jam release directly opposite the two heads. These platens work independently and provide the spring force required to keep a good document in position as well as flattening a previously creased document. Set-up of the MICR platens is a very critical balance of proper spring loading and minimum document drag which, when not properly adjusted, can cause skew and speed variations.

Characters of the E-13B font, printed with magnetic ink, are DC magnetized when they pass the write head gap. As a character passes the read head gap, a voltage is induced for each change in the amount of magnetic flux. Assuming uniform ink strength within a character, the flux changes will be due to character features. An increase in the amount of ink, such as the leading edge of a vertical stroke, results in a signal of one polarity, while a decrease in ink results in a signal of the opposite polarity. Relative signal amplitude is a function of the amount of flux density change.

Figure 1:
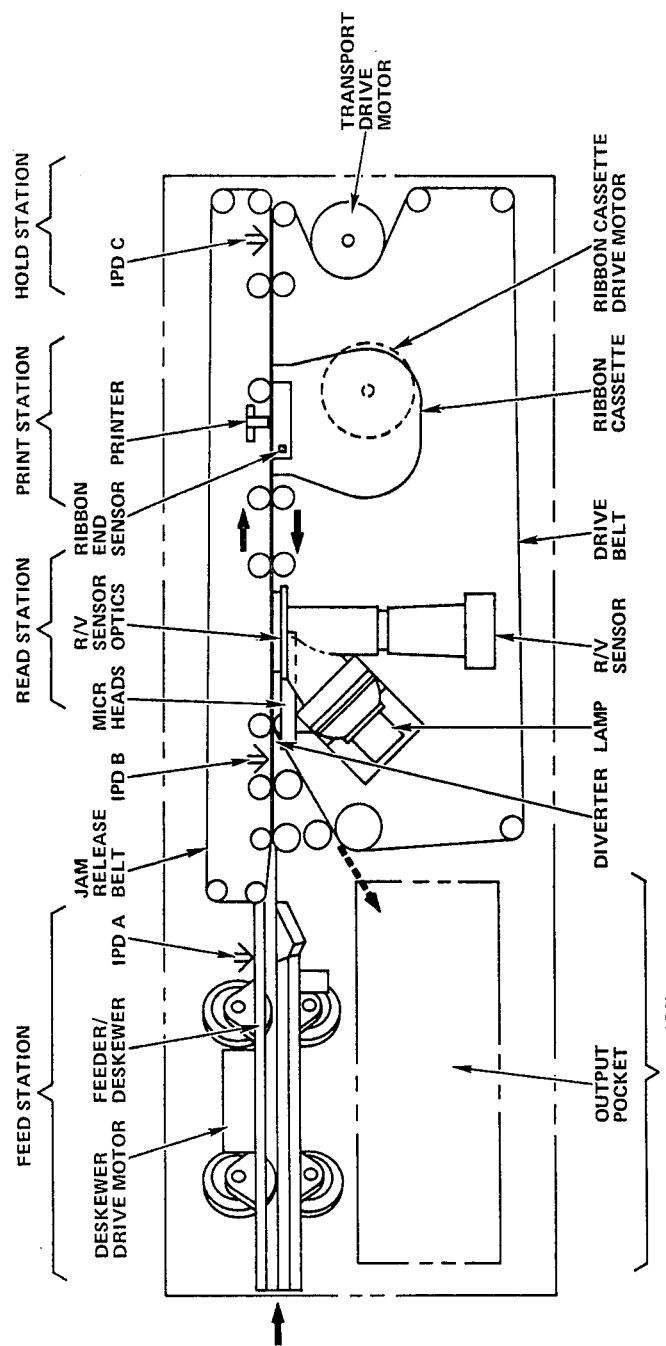
FIG. 1 is a functional representation of the transport in which the MICR reader is a part.
Figure 2:
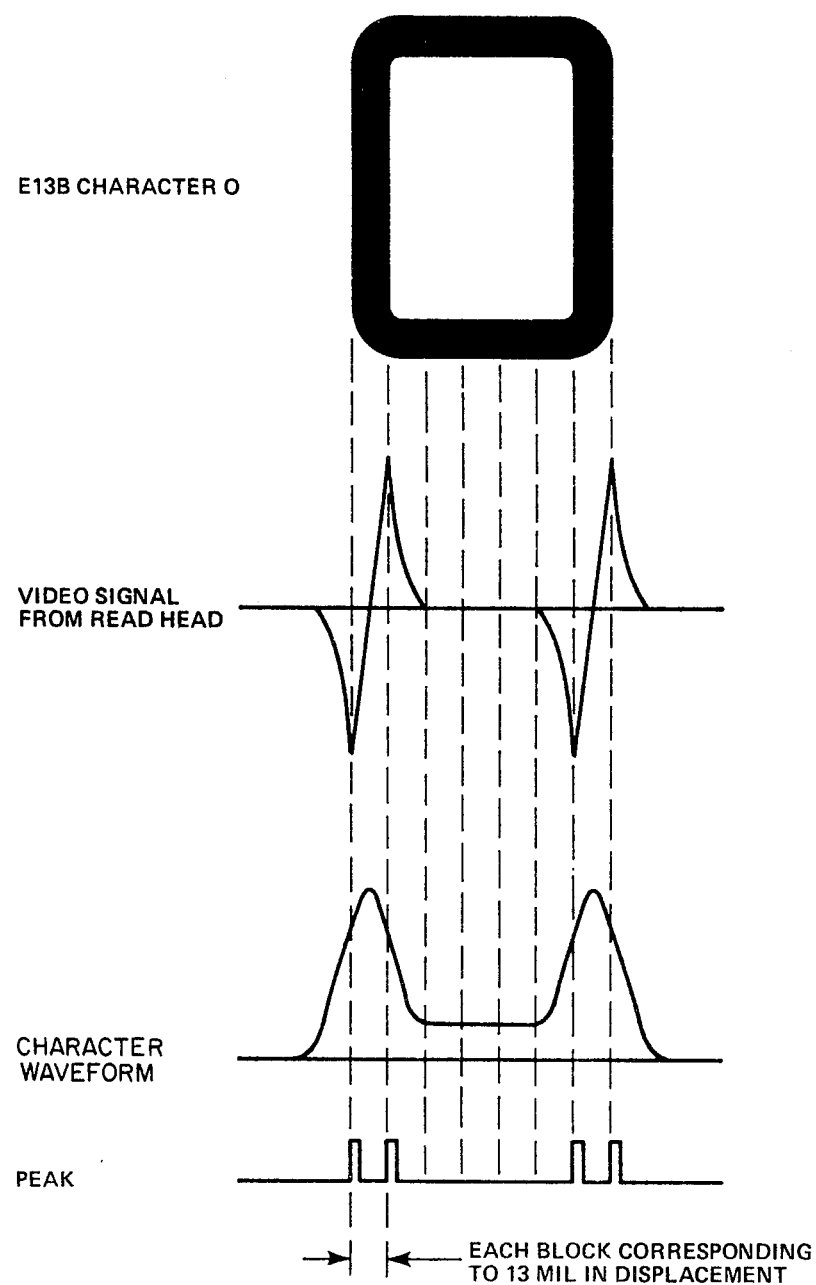
FIG. 2 illustrates an E13-B "0" and the magnetic waveform representation thereof.

FIG. 2 shows the E-13B character "0" and the corresponding waveform. It can be seen that the read head video signal is a differentiation of the character's magnetic intensity. By integrating this signal, a "character waveform" is developed which indicates the total amount of ink passing the read head gap. It is this waveform that is analyzed and recognized by the decision logic of the MICR system.

All feature changes of the highly stylized E-13B characters occur at 0.013" intervals, or multiples of this internal. The horizontal location logic of the MICR system generates a "character window" representing eight such intervals, and adjusts system timing such that character feature changes are aligned within these intervals.

The character waveform is amplitude normalized to compensate for variations in ink strength from character to character. It is then analyzed by comparing its normalized amplitude within each of the eight blocks with expected values representing each of the fourteen characters stored in a read-only memory (ROM). At the end of the process, an output character code is generated corresponding to the best-matched ROM pattern. The degree of correlation must be within a certain limit and no other ROM pattern shall have been equally matched, or a reject code is output. The MICR Data Available signal is received by the transport controller, which then accepts the output character code and resets the Data Available Flag. If a measured amount of time passes without character activity, a space code is output to the transport controller.

Figure 3:
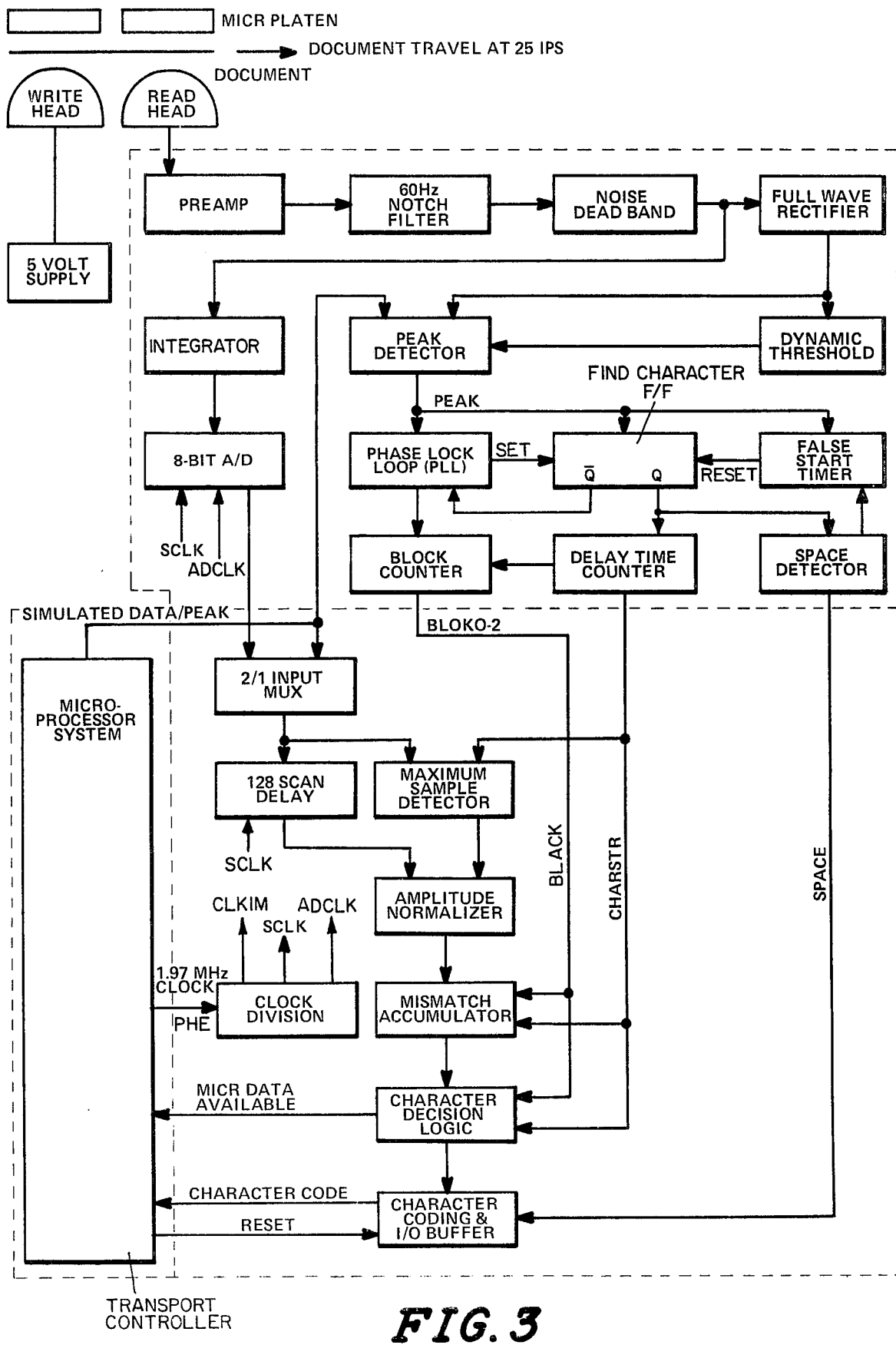
FIG. 3 is a block diagram of the MICR waveform analyzer.

FIG. 3 is a block diagram of the MICR waveform analyzer. As previously discussed, the write head DC magnetizes the E-13B magnetic ink imprinted characters and the adjacent read head senses the differentiation of the magnetic field. The video signal is connected to the recognition logic circuit which is divided into an analog section and a digital section is also called MICR Logic which means Magnetic Ink Character Recognition logic.

The analog section of the logic consists of the following functional blocks: Preamplifier, 60 Hz Notch Filter, Noise Dead Band Circuit, Full wave Rectifier, Peak Detector, Dynamic Threshold, Integrator and an 8-Bit Analog/Digital (A/D) converter.

The Preamplifier is a two stage circuit with a total gain of 4,800. The signal from the MICR Read head results from variations in the flux density of the magnetized ink, i.e., the amount of ink passing the MICR Read head gap.

The 60 Hz Notch Filter sharply attentuates the power-line component of the character signal. A long time constant integrator monitors the output of the filter and functions to provide a correction voltage to be returned to the Preamplifier, compensating for offsets and keeping the signal centered about zero.

The Noise Dead Band circuit removes the first 40 millivolts of signal above and below zero in order to eliminate any baseline noise.

The Full Wave Rectifier inverts the negative portion of the video signal, producing signal peaks of positive polarity.

The Peak Detector utilizes a differentiator and a zero crossing detector to produce a digital signal, indicating the time when character feature changes occur. This digital signal must meet a minimum width requirement to be passed and is termed 'PEAK.'

The Dynamic Threshold circuit provides a further qualifying term for the digitized edge signal. The threshold voltage is derived from a percentage of the rectified signal, and stored by a capacitor which has a controlled discharge rate. A minimum threshold voltage is provided by a diode 'OR' circuit.

The amplified, filtered, noise-reduced signal from the Dead Band Circuit is also applied to an Integrator. The output from the Integrator is a representation of the total amount of magnetic ink passing the MICR Read head gap. The shape will be according to character features and magnetic strength of the ink.

This logic changes the Integrator's character waveform to a digitized form for further processing and recognition by the MICR logic. The conversion rate is at the MICR system sample rate of 32 microseconds.

The logic functions to perform horizontal location of character data, based upon the time relationship of character peaks. The horizontal location logic consists of the following logic: Find Character Flip Flop, digital Delay Time Counter, False Start Counter, Block Counter and Space Detector. The first peak of a character sets enabled by the Find Character Flip Flop, initializes the digital PLL, enables three timers and arms the Space Detector. The three timers are Peak Interval Timer, Delay Time Counter (128Sample Delay), and False Start Timer.

The leading and trailing edge of character strokes of the E-13B font are designed to occur at 13 mil intervals or multiples of 13 mils. The MICR logic creates a character window, equal in time to eight (8) such intervals. These are denoted as blocks. At a Transport speed of 25 inches Per Second (IPS), one block is 520 microseconds. Each block is subdivided into sixteen (16) parts or samples. Sample Clock (SCLK) is the main System Clock and is 32.5 microseconds, derived from the Transport microprocessor 1.97 MHz clock (PHE).

The Find Character Flip Flop is reset by the signal Character Start, (CHARSTR), allowing the logic to search for another character.

The function of the PLL logic is to synchronize a sixteen (16) step counter with character peaks, such that the peaks will coincide with the counter roll over from count 15 to zero. The counter operates at the SCLK rate. The first peak of a character sets the counter to a count of one. Since character peaks occur at block intervals or multiples thereof, each subsequent peak should coincide with the counter rollover to zero. A ROM with correction factors stored for each of the counter states provides a load value for the counter at the time a character peak occurs and can advance or retard the count two steps. For example, assume that a character peak occurs and that the counter is at a count of 3. The next clock will load the ROM correction value 2, which is a correction of two counts since the next count would have been 4. It must be noted that at the end of each character, the digital PLL normally is blocked to the average of the character peaks because few EBB characters are well printed to the specification that these peaks are exactly 13 mil or a multiple of 13 mils apart and due to the correction range of the ROM to be limited two counts or an equivalent of + or − 12.5% per peak, a mislocated peak (character edge) will not mislocate the character significantly.

Another PLL correction method is the Peak Interval Timer, a sixteen (16) step counter that is loaded with the value 13 when a character peak occurs. If the counter is between a count of 12 and 15 when the next character peak occurs, indicating that the peaks therefore does happen at 13 mils or a multiple of 13 mils intervals, the signal PLLRST is generated which forces the PLL counter to a count of one due to the validity of the peaks. In other words, more weight is given to well printed character edges to correct the possible error in the first peak location.

The Delay Time Counter is a 128 Sample Delay that is initialized and enabled by the Find Character Flip Flop. Character waveform data is delayed by 128 sample clocks, one character period on the MICR logic. This one character delay allows digital Phase Lock Loop to lock up on the average location of peaks and therefore provides the look-ahead capability for the horizontal location logic and also for amplitude normalization by the MICR.

The Delay Time Counter measures this period and signifies the emergence of character data from its delay line. The output of the counter then waits for the PLCENTER from the PLL ROM, which is a decode of the PLL Counter States 7, 8 or 9, indicating the center of a block. This will produce an important timing signal, Character Start (CHARSTR). At this time the state of the PLL Counter is loaded into a slave counter to allow the PLL to operate on the next character. The slave counter is free running at the sample rate and therefore rolls over at block intervals. A count of 8 indicates the center of a block, to optimum time to analyze the character waveform. This timing information is output to the mismatch acculator logic by the signal 'BLACK.'

The False Start Timer functions to measure the interval between character peaks. If none occur within a specified period of time, the assumption is made that the Find Character Flip Flop was set by something other than a valid character and the flip flop will be reset.

The Block Counter is initialized by the signal 'CHARSTR' and allowed to increment when the slave PLL counter indicates the end of a block time period. The 3-bit block count is used by the MICR logic during waveform analysis. If no peaks occur within five (5) block periods, or 62.5 percent of a character time period, the Space Detector signifies a 'space'. An 8 block delay places the space indication in a time frame with the delayed character data.

The Space Detector can only generate one consecutive space and then only if a character peak has been previously found.

A character period is defined as being 128 samples initiated by the first peak (first edge) of a character. This period is subsidivided into 8 blocks of 16 samples, each block representing one 13 mil interval of paper travel. Character features of the E-13B font occur at 13 mil intervals or multiples thereof.

The Horizontal Location logic performs horizontal location of character data resulting in contol signals that are time relatd to the character. These control signals are used by the MICR logic for synchronizing the waveform analysis apparatus with the character waveform.

The MICR logic has five more functions. These are Clock Divider, 128 Scan Delay Line, Character Waveform Amplitude Normalizer, Character Waveform Analyzer and Output Interface to the Transport Controller.

The Clock Divider divides the 1.97 MHz clock (PHE) of the Transport Controller down to the three System clocks which are 1 microsecond clock (CLKIM), 2 microsecond clock (ADCLK) used by the A/D Converter and 32.5 microsecond Sample Clock (SCLK).

The 8-bit word serially describing the character waveshape is shifted through an 8-bit parallel, 128-bit serial delay line. The shift rate is at the sample rate (SCLK). The one-character delay allows look-ahead capability for the horizontal location logic and for amplitude normalization by the normalizer logic.

Characters are recognized by their waveform which is a function of character feature but the waveform amplitude is a function of the ink signal strength.

The Amplitude Normalizer makes all characters the same size by a rationing technique. The largest sample of a character is found during the look-ahead time by the Maximum Sample Detector. At the end of the look-ahead period the maximum sample value is transferred to the Maximum Data Buffer. Combinational logic operating on the maximum sample value steers Multiplexers to output the four Most Significant Bits (MSB) of the maximum sample value, and Multiplexers to output the corresponding four (4) bits of character data emerging from the delay line.

The four Maximum Sample bits and the corresponding four data samples bits are presented to the Normalizer ROM which performs the arithmetic operation:

$$\frac{S(\text{Data Sample})}{MS(\text{Max. Sample})} \times 7$$

This results in a character waveform described by a succession of 3-bit words and where the tallest feature of the waveform will have the value 7. The application of using simple multiplexes to peak up the 4 most significant bits before the circuit encodes the amplitude into the binary 3 bit normalized value code reduces the size of encoding ROM from $65536 \times 3$ bits to $256 \times 3$. Therefore, a significant savings of hardware is achieved.

Character recognition is accomplished by finding a correlation between the normalized waveshape and one of the defined character waveform patterns stored in ROM. During each of the eight (8) blocks that divide a character time, the normalized amplitude value of the incoming waveform addresses a mismatch value, sequentially for all fourteen character patterns and adds it to the contents of the accumulator register corresponding to the character pattern number. The fourteen, 4-bit mismatch accumulators are contained by a $16 \times 4$-bit memory I/C which is addressed by the Character Identity Counter and a 4-bit adder.

As the mismatches are accumulated during the last block, a register keeps track of the Character Identity Code which has the fewest total mismatches. If the mismatch value was less than 12, and if no other character code had the same number of mismatches, the decision character number is picked up to be the one with least mismatch points and then it is converted by a ROM to ASCII and output to the Transport Controller. If a space has been detected by the Horizontal Location logic, the ROM outputs the ASCII code for space.

At the end of a character decision cycle, or if a space has been detected, a handshake signal MICR Data Available (MICRDAV) is generated. The Transport controller responds by reading the ASCII output and generating the Reset MICR Data Available (RMICR-DAV) signal.

Figure 4:
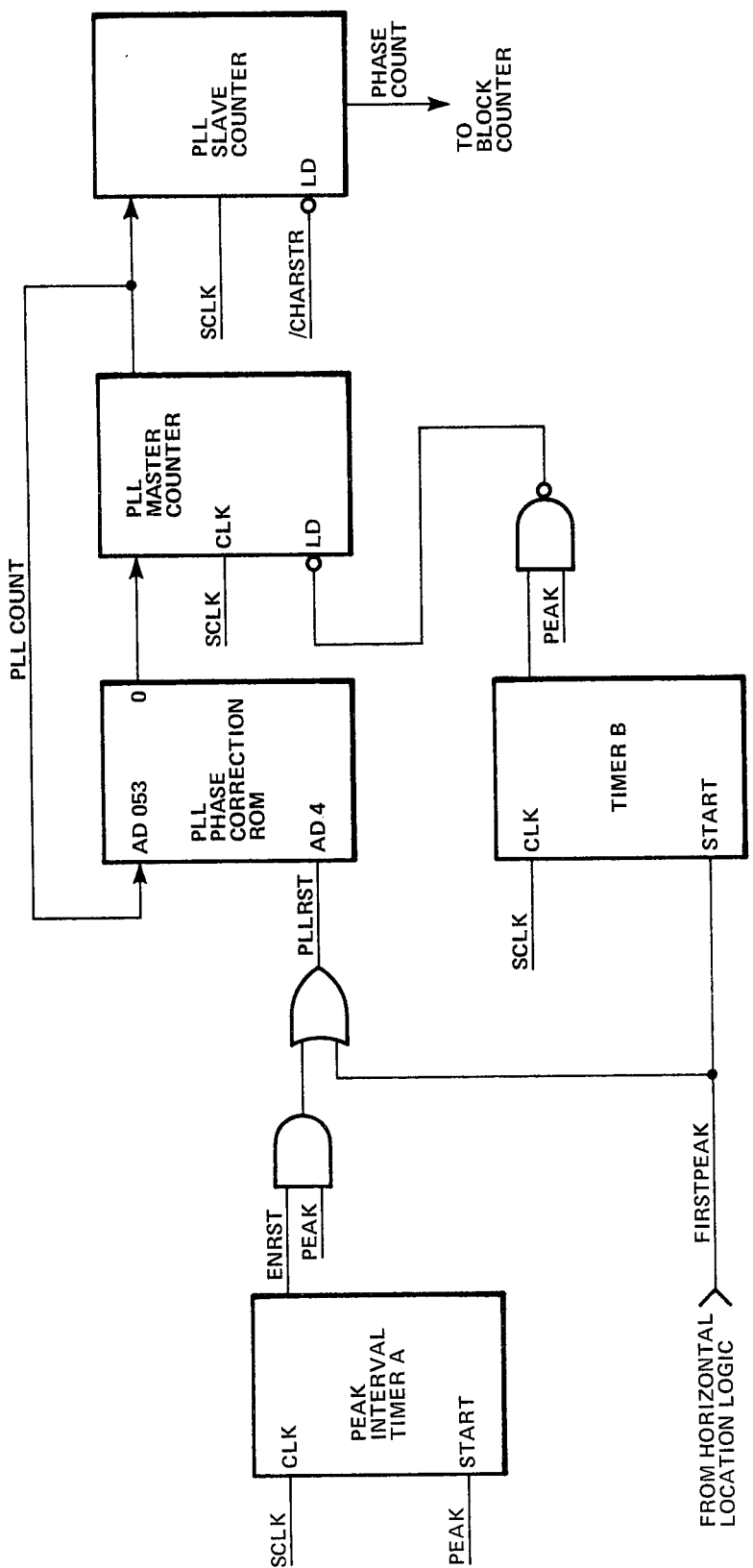
FIG. 4 illustrates the block diagram of a digital Phase Lock Loop.

FIG. 4 illustrates a block diagram of digital phase lock loop. The purpose of the digital phase lock loop, or simply called "PLL," is to phase lock on the peaks of a character video signal so that the phase of each sample relating to the peaks can be identified. As previously discussed, the A/D converter samples the character waveform which is the integrated waveform of video signal 16 times per 13 mil of document moving time. In this system, the sampling clock (SCLK) rate is $0.013/(16 \times 25) = 32.5$ microsecond. Since E-13B character fonts are designed for 13 mil spacing for each vertical stroke, all the peaks of an ideally printed character should be separated by a multiple of 16 sampling clocks array because each peak implies the edge of a vertical stroke. But a large percentage of E-13B characters printed today cannot meet that standard. There are $16 \times 8 = 128$ scans sampled for each integrated character waveform as shown in FIG. 2. Among the 128 scans, only 8 scans are really representative to the character feature. These 8 scans must be selected accurately between peaks. From experience, the stroke width of E-13B characters can vary from 8 to 15 mil. In other words, the distance count between two adjacent peaks can vary from 10 to 19 counts instead of 16 counts due to printing quality control problems.

In some instances the first peak of each character is used as reference for sampling. It has been found that a lot of characters have a mislocated first peak and thus can mislead the sampling scheme. One solution is to take all the peaks of a character into consideration and let the majority of the peaks decide the phase. This concept is achieved by using the PLL shown in FIG. 4. The center part of the PLL consists of a PLL Master Counter and a PLL Phase Correction ROM. The other circuit is used to qualify the incoming peak and initially reset the PLL (PLLRST). The PLL Master Counter may be a 4-bit binary counter such as Texas Instruments SN 74163. The PLL Phase Correction ROM may be, for example, a 32×4 ROM. All timers and counters are driven by the sampling clock SCLK. The Horizontal Location Logic detects the first peak of a character and sends it to PLL logic. FIRST PEAK sets PLLRST high which causes the PLL Phase Correction ROM outputs (4 lines) to be 1. It also starts a Timer B to enable the PEAK to preload the PLL Master Counter with 1's. The PLL Phase Correction ROM is programmed to correct the PLL up to ±2 counts by the following peaks. For example, if the next peak occurs at PLL count 13, the PLL ROM output will be 0. If the next peak occurs at PLL count 3, the ROM output will be 2. The PLL Master Counter is then loaded with this new number by each qualified peak and continues counting. Therefore, if the first peak is mislocated by a count of 6, the PLL logic will correct the phase after 3 consecutive upcoming correct peaks. Timer B will time out an average character time to block out any false peaks. Timer A, which is also called Peak Interval Timer, is started for every peak and enables a window for resetting the phase lock loop whenever it counts to a multiple of 16±1 SCLK pulses. In other words, if the next incoming peak is spaced at a multiple of 16 counts to the preceding one, the PLL will be immediately preset to 1 because a perfectly 13 mil spaced vertical stroke has been located. Thus after all peaks of a character pass through PLL, the PLL Master Counter will lock on the "Average" peaks of a character. A character start (CHARSTR) signal from horizontal location logic will load the PLL Master Counter phase information into a PLL Slave Counter which is also a 4-bit binary counter. The PLL Master Counter then is ready to phase lock on the next character and let the Slave Counter continue counting to provide phase reference to block counter for character decision logic. The character decision logic will only analyze the 8 digitized integrated video signal with a phase count of 8 among those 128 scans. Thus a data base reduction factor of 16 is achieved because (128/8)=16. These 8 scans represent the relative vertical stroke height. The rest of the samples are in a transition zone and thus useless for character recognition purposes. This PLL system results in significant savings on time and hardware requirements for the decision logic and also improves the read rate on poorly printed characters.

Figure 5:
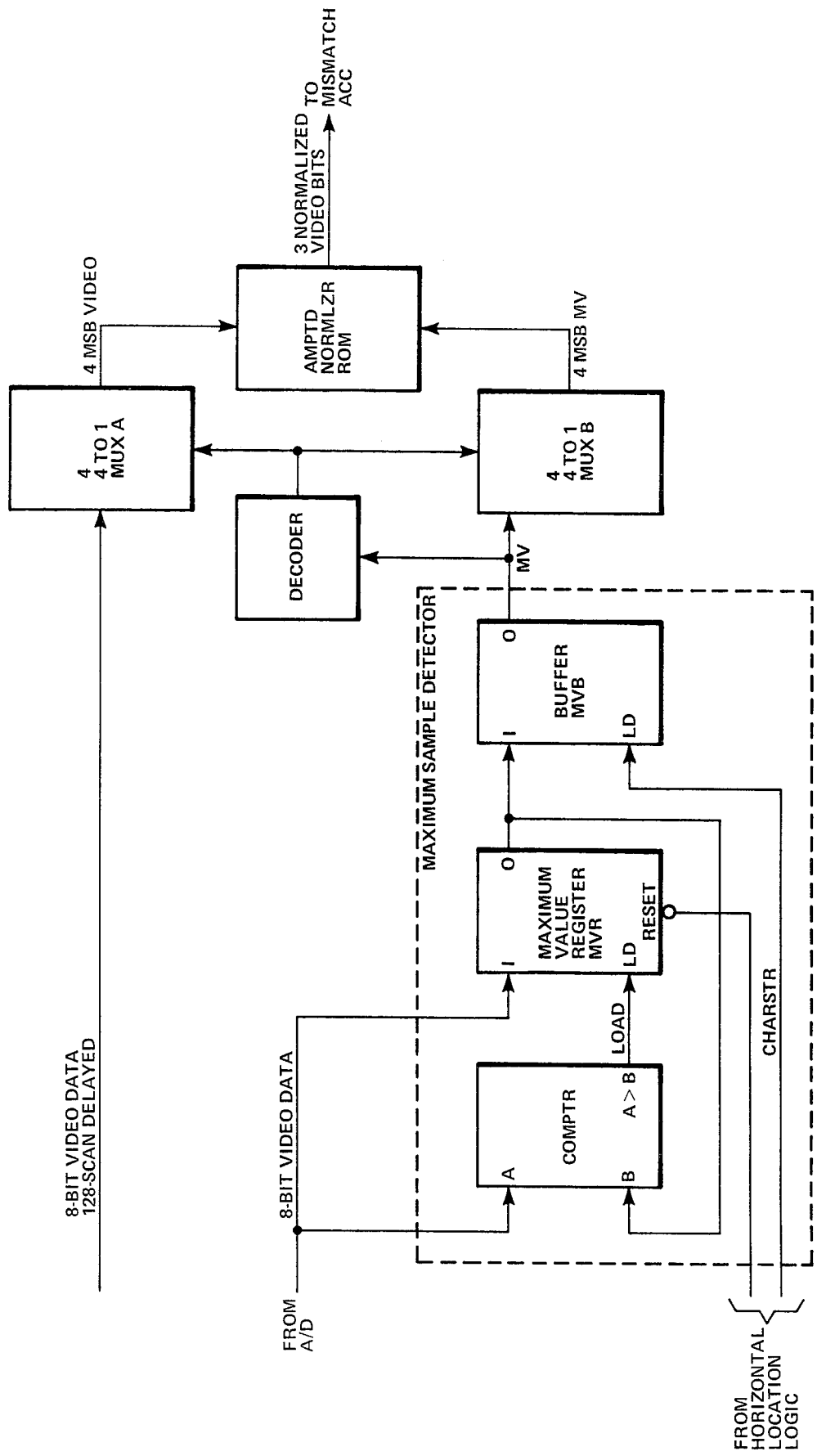
FIG. 5 is a block diagram of the Maximum Sample Detector and the Amplitude Normalizer.

FIG. 5 shows the Maximum Sample Detector and Amplitude Normalizer Block Diagram.

One major problem in reading E-13B characters is that the magnetic ink strength can vary from 30% of a normal ink strength to 300% of that strength. This, effectively, is a 1 to 10 dynamic range. Due to the fact that no signal strength reference can be provided before the MICR Read head senses the individual character, it is impossible to take care of the 1 to 10 ink dynamic range problem by using the conventional AGC (Automatic Gain Control) methods. It is also economically inefficient to use 8 bits to respresent the character waveform amplitude information for final waveform analysis. The Amplitude Normalizer will solve both problems by dividing the maximum sample value into the digitized data and then code the result in 3 bits.

The Maximum Sample Detector is comprised of an 8-bit Amplitude Comparator, a Register and a Buffer. At the beginning of a character, the Horizontal Location Logic resets the 8-bit Maximum Value Register (MVR) to 0. The output is connected to the 8-bit comparator which compares the 8-bit digitized character waveform input data with the register output. If the waveform data is greater than the output of the register, a LOAD signal is generated to load the waveform data into the MVR. At the end of a character passing through the Maximum Value Detector, MVR should contain the maximum value of that character waveform. The Horizontal Location Logic will output a CHARSTR signal to load the maximum value into the maximum value buffer (MVB) and then the MVR is ready to find the maximum value of the next character. The MBV output is connected to a Decoder circuit to determine the most significant bit of that character waveform. The maximum value is also connected to a 4 to 1 multiplexer (MUX B) where only the 4 most significant bits of the maximum value is output to the Amplitude Normalization ROM. The Decoder output also is connected to the identical multiplexer (MUX A) where the 128 scan delayed input data is to be multiplexed, so that the corresponding 4 most significant bits will be output to the Normalization ROM. The Normalization ROM is a 256×4 ROM. It divides the waveform data by the 4 MSB of Maximum Value Samples and codes it into 3 bits. For example, if the 4 MSB's of Maximum Value is to be $(A)_{16}$, a waveform data of $(A)_{16}$ will be coded as $(7)_8$ and a waveform data of $(5)_{16}$ will be coded as $(4)_8$. By using this technique, a further data base compression factor of $(8/3)=2.6$ is achieved, and a dynamic range compensation of 1 to 16 is performed. When these 3 normalized waveform data are sampled with the PLL output, a total data base compression factor of 4,266% is obtained because $(2^{18}\times 8)/(8\times 3)=1024/24=42.66$. The effect of the data base compression will be seen in the mismatch accumulator illustrated in FIG. 6.

Figure 6:
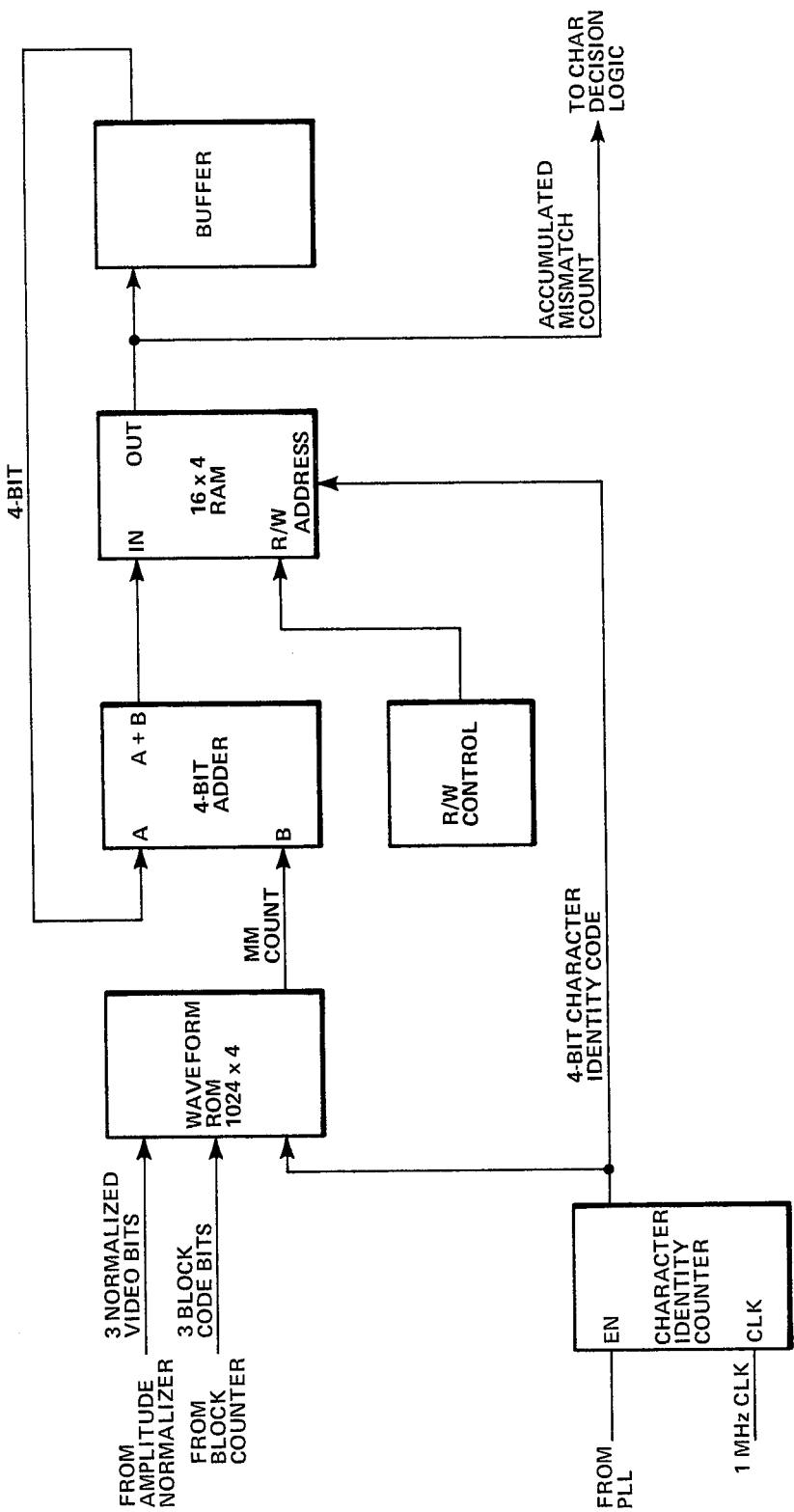
FIG. 6 is a block diagram of Mismatch Accumulator.

FIG. 6 is a block diagram of a Mismatch Accumulator.

A character waveform ROM with 1024×4 bits stores the character waveform mismatch counts. This ROM has 10 input address lines. The first three address line inputs are the three normalized waveform bits as discussed in FIG. 5. The next three address line inputs are the three block count bits from the Block Counter which identify the block number of the character. The last four address line inputs are from a Character Identity Counter which is a 4-bit binary counter counting from $(0)_{16}$ to $(D)_{16}$ at 1 MHz frequency rate. This counter increments from $(0)_{16}$ to $(D)_{16}$ each time the block counter increments by 1. The 4 ROM output bits are programmed such that the mismatch counts are higher if the corresponding normalized waveform amplitude value is farther away from the stored ideal waveform value. For example, for the scan of the first block for character 0, the block count will be $(0)_8$, the Character Identity Count will be 0, and the stored ideal amplitude code should be $(7)_8$ because the first block of the character 0 is the largest vertical stroke. Therefore, the mismatch point for address $(7)_{1024}$ is 0. On the contrary, if the first scan amplitude is $(0)_8$, the mismatch count will be a maximum $(F)_{16}$. The mismatch count for a waveform amplitude from $(0)_8$ to $(7)_8$ will decrease accordingly. In other words, the mismatch count for each individual scan is weighted by 16 steps. These weighted mismatch counts are connected to a 4-bit adder where the mismatch points from the previous blocks are added together and output to a 16×4 RAM for storage. At the beginning of a character mismatch accumulation, the RAM output buffer is cleared by Start Decision Controller (STDC) so that only the first block mismatch counts are stored in address locations $(0)_{16}$ to $(13)_{16}$. RAM address locations 14 and 15 are not used because there are only 14 E-13B character fonts. After the first block, each time the character identity counter increments, the R/W control logic will force the RAM to the read mode first for the system to fetch the previously accumulated mismatch counts and store them in the buffer. Secondly, the R/W control changes to the Write mode for the system to write the newly accumulated mismatch count into the RAM. After the Block Counter counts to $(7)_8$ and the character identity counter counts to $(D)_{16}$, the 16×4 RAM will contain the mismatch points of all the 14 pre-defined character waveforms for the input character waveform. Then the decision logic will compare the 14 accumulated mismatch counts to determine which one is the best match. If there is only one least mismatch count and that accumulated mismatch points is less than 12, then a character decision is made by selecting the RAM address that contains the least mismatch count as the character identity code.

Since all the waveform analyzing algorithms are based on 16 scans for each of eight 13 mil blocks of an E-13B character, this reader can be applied to the transports having speed other than 25 IPS by simply changing the Scan Clock Rate. For example, if the transport speed is 20 IPS, the Scan Clock rate will be:

$$\frac{13 \times 10^{-3}}{20 \times 16} = 40.625 \text{ microsecond}$$

The rest of the logics remain the same.

It can be seen that the original digitized data has $128 \times 8 = 1024$ bits for each character. Without any data compression technique, it would be an enormous task for the mismatch accumulator to analyze those bits rather than only 24 ($8 \times 3$) bits that resulted from the present invention.

Having described a preferred embodiment of the invention, further embodiments and modifications will be suggested to those skilled in the art, which embodiments and modifications are deemed to be within the scope of the invention as defined in the following claims.

What is claimed is:

1. A waveform analyzer for reading magnetic ink characters wherein an electrical video signal is produced as the characters pass a pickup head, said video signal containing character data and possibly error data signals, comprising:
    means for integrating the video signal representative of an entire magnetic ink character to produce a character waveform;
    processing means for digitizing and then normalizing the digitized character waveform to normalize character ink strength variations; and
    sampling means for locating and selecting samples of the digitized character waveform as distinct from error data signals to present to a recognition system.

2. The analyzer according to claim 1 wherein said sampling means includes a peak detector and phase lock loop, the phase lock loop locking onto valid peak pairs produced by said peak detector.

3. The sampling means according to claim 1 including horizontal location logic circuits for horizontally locating the character data waveform signals for each character.

4. The analyzer according to claim 1 wherein the means for integrating is reset at the beginning of each character read.

5. The analyzer according to claim 2 wherein the phase lock loop locks onto peaks which are 13 mils apart or multiples of 13 mils.

6. A waveform analyzer for reading magnetic ink characters wherein a video signal is produced as the characters pass a pickup head, said video signal containing character data and possibly error data signals, comprising:
    an integrator circuit for integrating the video signal over a character period to produce a character waveform signal,
    an analog to digital converter for digitizing said character waveform signal;
    a time delay circuit for delaying the waveform signal;
    a time delay circuit for delaying the integrated and digital character waveform signal for one character period;
    a normalizer for amplitude normalizing the character waveform signal;
    a peak detector for detecting peaks in the video signal;
    a phase lock loop for locking onto valid pairs of peaks resulting from scanning a character; and
    a horizontal location circuit for identifying a character horizontally within the video signal,
    wherein the character waveform is gated by the horizontal location circuit for identifying the character producing the video signal.

* * * * *